(12) United States Patent
Patel et al.

(10) Patent No.: US 12,450,249 B2
(45) Date of Patent: Oct. 21, 2025

(54) PIPELINE WITH CONTEXT TRANSFER

(71) Applicant: International Business Machines Corporation, Armonk, NY (US)

(72) Inventors: Dhavalkumar C. Patel, Yorktown Heights, NY (US); Markus Müller, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/385,299

(22) Filed: Oct. 30, 2023

(65) Prior Publication Data

US 2025/0139113 A1    May 1, 2025

(51) Int. Cl.
*G06F 16/25* (2019.01)
*G06F 16/242* (2019.01)

(52) U.S. Cl.
CPC ........ *G06F 16/254* (2019.01); *G06F 16/2428* (2019.01)

(58) Field of Classification Search
USPC .......................................................... 707/602
See application file for complete search history.

(56) References Cited

U.S. PATENT DOCUMENTS

| | | | |
|---|---|---|---|
| 2016/0062736 A1* | 3/2016 | Stanfill | G06F 8/34 717/105 |
| 2018/0302423 A1 | 10/2018 | Muddu et al. | |
| 2019/0014137 A1 | 1/2019 | Du et al. | |
| 2019/0384659 A1* | 12/2019 | Johannsen | G06F 9/542 |
| 2020/0074085 A1 | 3/2020 | Cheng et al. | |
| 2020/0195679 A1 | 6/2020 | Du | |
| 2022/0075651 A1* | 3/2022 | Harboe | G06F 8/445 |
| 2023/0140169 A1* | 5/2023 | Armbrust | G06F 16/254 707/798 |
| 2023/0259521 A1* | 8/2023 | Haelen | G06F 16/254 707/602 |

* cited by examiner

*Primary Examiner* — Joshua Bullock
(74) *Attorney, Agent, or Firm* — CHIP LAW GROUP

(57) ABSTRACT

An example operation may include one or more of executing a first processing element among a sequence of processing elements within a data processing pipeline on input data to generate a first output, transferring the first output and context associated with the first processing element from the first processing element to a second processing element among the sequence of processing elements, within the data processing pipeline, executing the second processing element on the first output and the context to generate a second output, and storing the second output in memory.

20 Claims, 8 Drawing Sheets

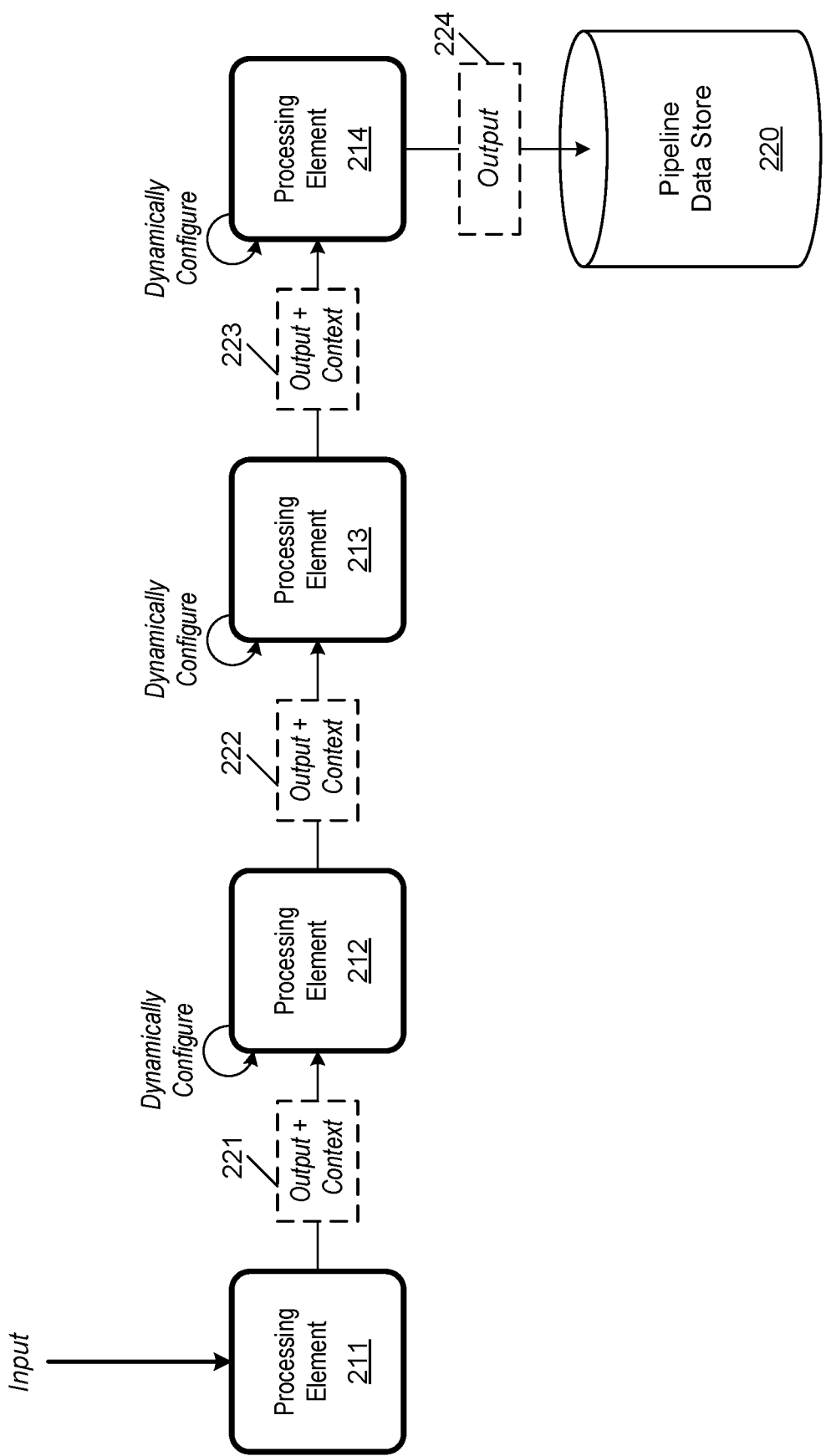

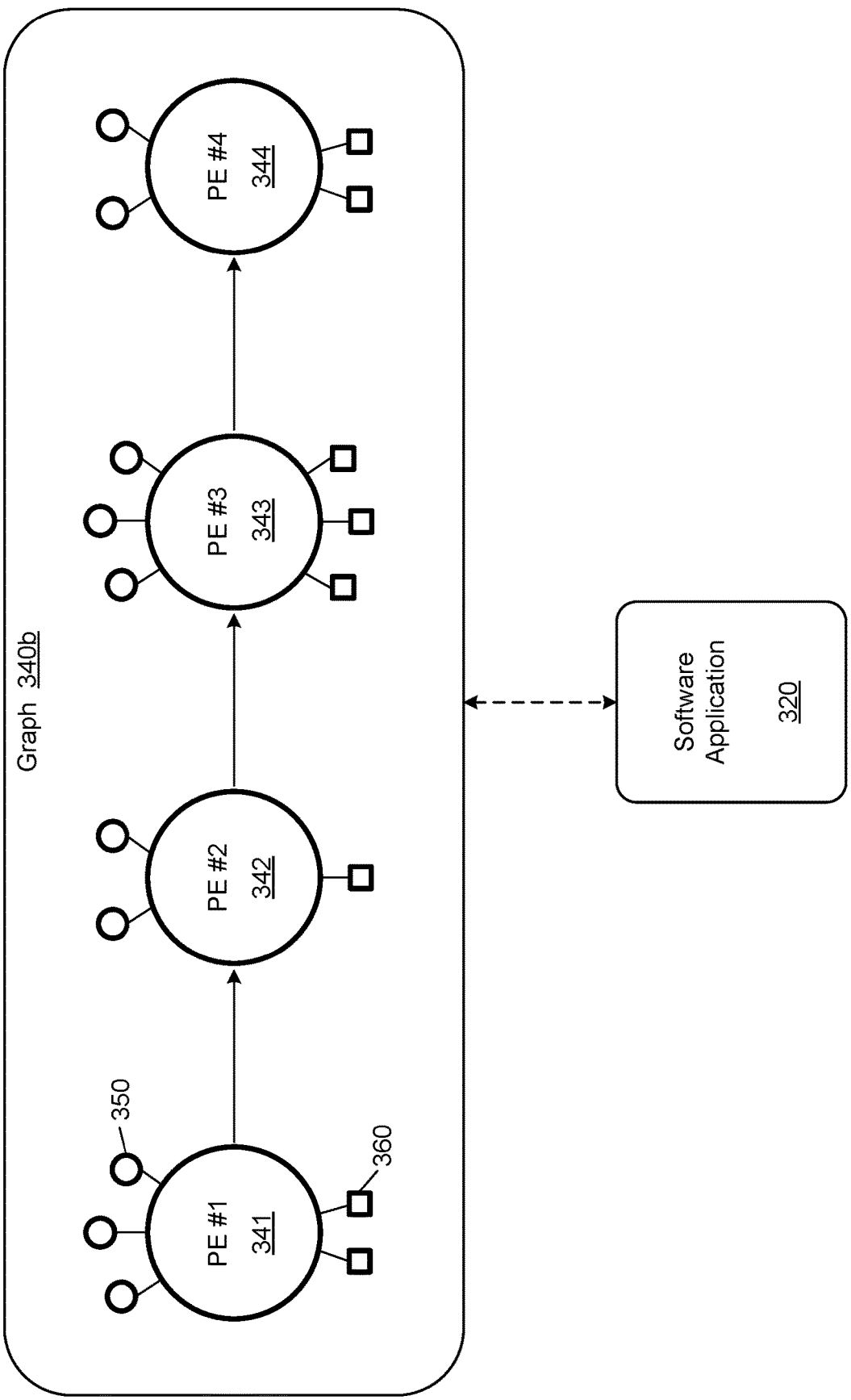

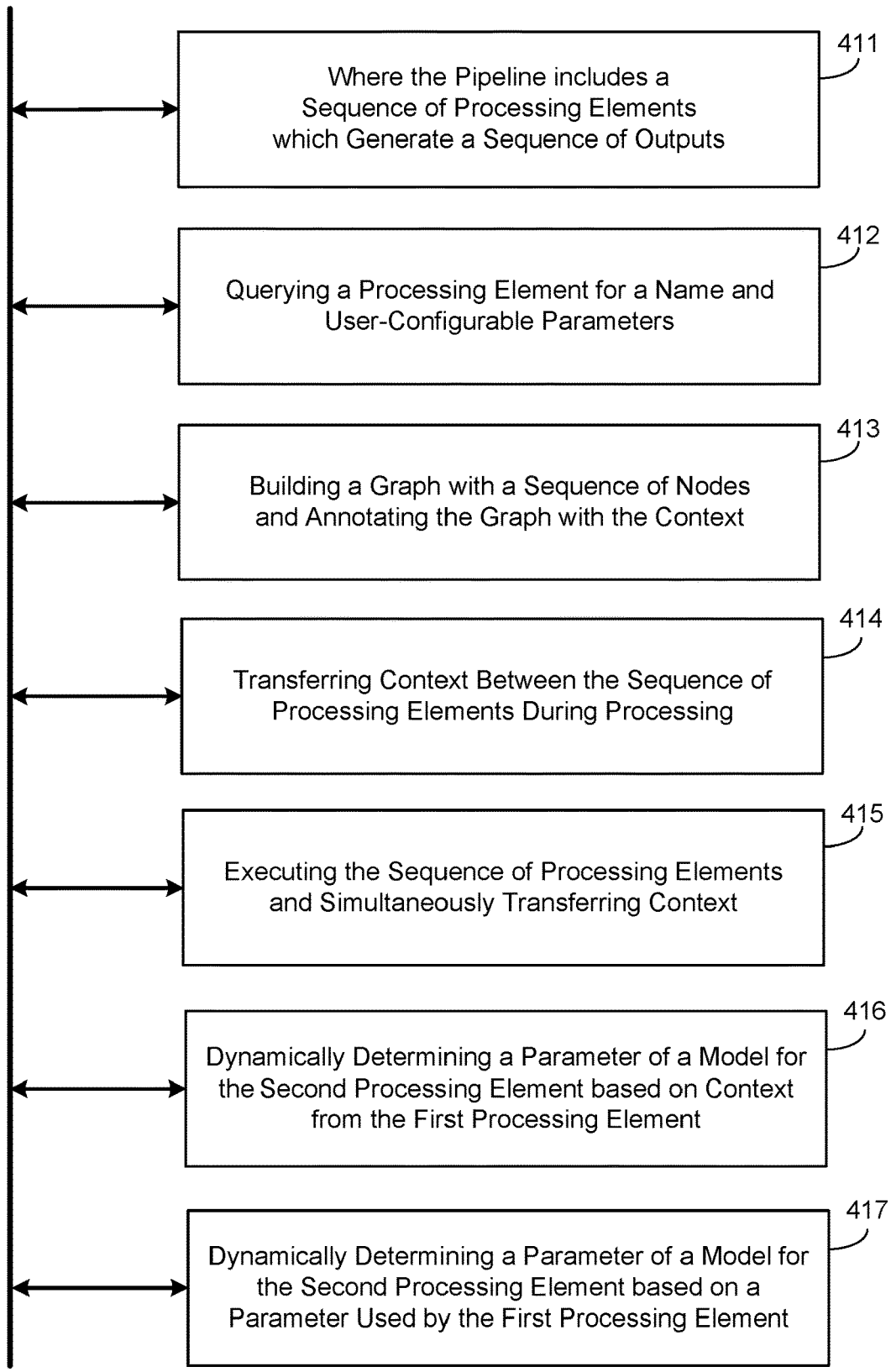

PIPELINE WITH CONTEXT TRANSFER

BACKGROUND

A pipeline is a set of data processing elements connected in series where the output of one element is the input to the next. At each step in the pipeline, an additional operation is performed on incoming data.

SUMMARY

One example embodiment provides an apparatus that may include a memory, a processor, wherein the memory and the processor are communicatively coupled, and a data processing pipeline that includes a sequence of processing elements that are configured to execute a first processing element among the sequence of processing elements on input data to generate a first output, transfer the first output and context associated with the first processing element from the first processing element to a second processing element among the sequence of processing elements, execute the second processing element on the first output and the context to generate a second output, and store the second output in the memory.

Another example embodiment provides a method that includes one or more of executing a first processing element among a sequence of processing elements within a data processing pipeline on input data to generate a first output, transferring the first output and context associated with the first processing element from the first processing element to a second processing element among the sequence of processing elements, within the data processing pipeline, executing the second processing element on the first output and the context to generate a second output, and storing the second output in memory.

A further example embodiment provides a computer-readable medium that includes instructions, that when read by a processor, cause the processor to perform one or more of executing a first processing element among a sequence of processing elements within a data processing pipeline on input data to generate a first output, transferring the first output and context associated with the first processing element from the first processing element to a second processing element among the sequence of processing elements, within the data processing pipeline, executing the second processing element on the first output and the context to generate a second output, and storing the second output in memory.

BRIEF DESCRIPTION OF THE DRAWINGS

FIG. 2 is a diagram illustrating a data pipeline which transfers context between processing elements according to example embodiments.

FIGS. 3A-3D are diagrams illustrating processes for configuring parameters of a data pipeline based on context according to example embodiments.

FIG. 4B is a diagram illustrating a method of executing a data processing pipeline based on context transfer between processing elements according to other example embodiments.

DETAILED DESCRIPTION

Figure 1:
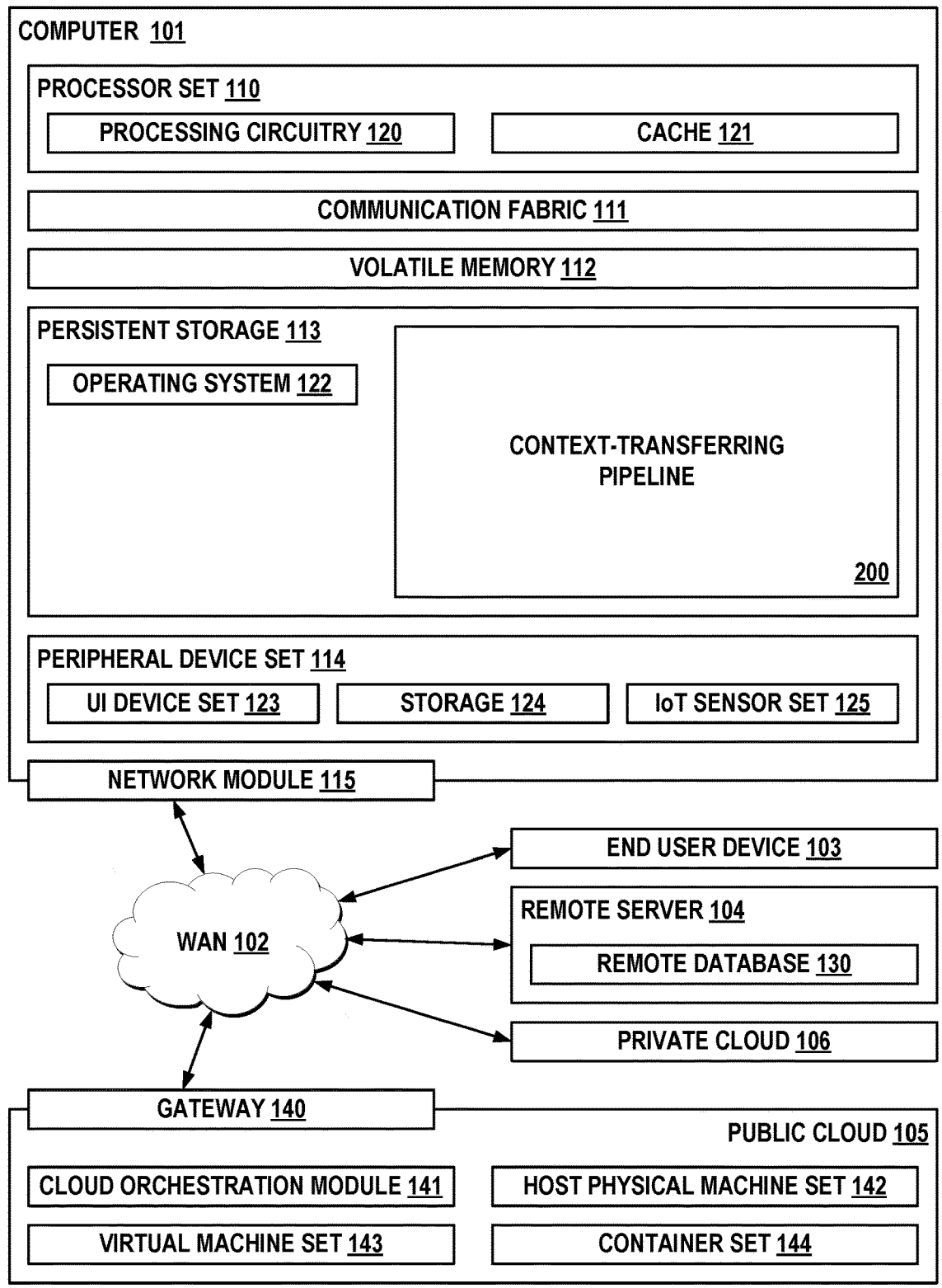
FIG. 1 depicts a computing environment, according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a data pipeline in which a processing element or node can transfer context to a next processing element in the data pipeline. That is, in addition to transferring a data output, the processing elements also transfer context between themselves. The pipeline includes a sequence of processing elements that each perform a sub-task on input data to generate a final output. As an example, the data pipeline may be a machine learning pipeline, an extract, transform, and load (ETL) pipeline, and the like. Meanwhile, the context may include parameters associated with the execution of a task at a respective processing element which are then provided to a next processing element in the pipeline.

For example, the parameters that are generated by a first processing element and transferred to a next processing element in the pipeline may be used to dynamically configure process execution by the next processing element in the pipeline. The dynamic execution may be based on a value of the parameter. For example, if a first model uses a first parameter to transform content, a second model may use a corresponding parameter when executing a second model on the transformed content. In some embodiments, the dynamic configuration may be integrated into the logic of the respective processing elements. For example, a processing element may be configured to perform a task differently under different conditions, such as different parameter values included in the context from the previous processing element. Thus, both data and context are transferred between the processing elements in the pipeline, rather than just data as is traditionally done.

Some of the benefits created by the example embodiments include enabling data-driven parameters to be used to dynamically configure the processing that is executed by the processing elements within a data pipeline. The system also enables parameters to be exchanged in any direction within the pipeline. For example, a subsequent processing element may feed context to a previous processing element, such as for a next processing run on the pipeline, etc. Other benefits include enabling connections between parameters of different components, simplifying parameter value composition, building a graph, annotating the individual nodes/elements in the graph with context, a user interface enabling a user to configure conditional execution of the processing elements, and the like.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for executing at least some of the computer code involved in performing the inventive methods, such as context-transferring pipeline 200. In addition to the context-transferring pipeline 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the context-transferring pipeline 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the context-transferring pipeline 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in the context-transferring pipeline 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

The example embodiments are directed to a data pipeline, also referred to as a processing pipeline. The data pipeline includes processing elements that may be arranged in serial (sequence), in parallel, in combination of serial and parallel, and the like. During processing, context associated with a processing element may be transferred to the next processing element in the pipeline. The context may identify one or more parameters of a machine learning model, a statistical model, a script, a software application, a software program, a data store, or the like. Here, the context includes additional data that can be leveraged for improving the performance of the processing element. For example, the context may include a parameter of other value which the receiving element uses to select a parameter value to use during execution, select a parameter value that should be produced, data that can be used to validate the correctness of a component within the pipeline such as a processing element, and the like.

The context that is passed between elements may include parameters that have a name, a data type, and the like. In some embodiments, the parameters are variables or other parameters, range values, etc. that are used by a machine learning model, a statistical model, an artificial intelligence model, and the like. The context passed from a first processing element to a second processing element may control a parameter that is used by the second processing element. For example, the second processing element may include conditions that are triggered by different vales of the parameter that is passed to the second processing element. For example, if the parameter has a value between a first range of values may cause the second processing element to execute a model with a first parameter. As another example, if the parameter is greater than the first range of value but less than a second threshold, a second/different parameter may be used by the model.

Pipelines, including machine learning pipelines, are an active area of research. Pipelines are traditionally a defined a set of steps, where each step in the pipeline performs a unit of operation on incoming data and generates transformed data for subsequent steps in the pipeline. The last steps in the pipeline generates the final output for the pipeline from the transformed data. The interdependency between two adjacent steps in the pipeline is typically in a forward direction. It means that the pipeline execution starts with step 0, then step 1, and so on until the last step in the process is completed. As machine learning pipeline become more popular in industries, there are many emerging use cases where the steps of the pipeline need to be more connected and dependent.

Typically, the general semantics of many pipeline designs is based on an assumption of independent/isolated workstreams of each step in the pipeline. However, the assumption is not valid in many real use cases. As result, there are different needs that have emerged within the industry. The example embodiments address the needs. For example, the pipeline described herein may pass data (or transformed data) and context to a different processing element (not just an immediately adjacent processing element). The pipeline may adjust a context discovery step (e.g., such as number of clusters in k-mean, etc.) based on the future need of the component. Furthermore, an end user can specify the data-driven parameters and context discovery connections via a user interface. Furthermore, parameters may not be defined upfront and may only be available at the runtime (e.g., for complex pipeline covering deep learning and machine learning component, etc.) There is a need of an efficient execution mode based on new definition of the pipeline semantic.

FIG. 2 illustrates a data pipeline 202 which transfers context between processing elements according to example embodiments. Referring to FIG. 2, the data pipeline 202 includes a plurality of processing elements (PEs) including a PE 211, a PE 212, a PE 213, and a PE 214 that are arranged in serial order/sequence. Although not shown, it should also be appreciated that the data pipeline 202 may be part of a larger system that includes a memory device, a processing device, and the like. In this example, the input is submitted to the PE 211 which performs a first sub task on the input to generate an output. In addition to generating the output, the PE 211 also identifies context associated with the sub task that is performed/executed by the PE 211 on the input. Here, the context may include one or more parameters or the like. In this example, the PE 211 builds a message 221 which includes the output generated by the PE 211 and the context associated with the operation of the PE 211. Further, the PE 211 transfers the message to the PE 212.

The PE 212 may receive the message 221 including the context and dynamically configure a parameter of a task that is executed by the PE 212 on the output data from the PE 211. Here, the PE 212 may include conditions stored therein that identify different parameters, variables, etc. to use based on a value of the parameter within the context from the PE 211. Thus, the PE 212 may dynamically configure the processing it performs based on the context from the PE 211. Likewise, the PE 212 can generate an output based on execution of a different sub-task from the process. The PE 212 can generate a message 222 which include the output from the PE 212 and context from the execution of the different sub task by the PE 212.

The message 222 may be passed from the PE 212 to the PE 213 for processing a different sub task. Similar to the PE 212, the PE 213 may dynamically configure one or more parameters of the processing of the different sub task based on the context and the output in the message 222 from the PE 212. The PE 213 may also generate an output and then build a message 223 with the output and context from the processing performed by the PE 213 and submit it to the PE 214. The PE 214 may be the last PE in the sequence. Here, the PE 214 may configure a parameter of a final sub-task executed by the PE 214 dynamically based on the context in the message 223 from the PE 213. The PE 214 may execute the final sub-task to generate an output 224 and deliver the output 224 to a data store 220.

In the example embodiments, a first processing element may receive an input value and execute a first task on the input value to generate a first output value. The first output value may be transferred to a second processing element that executes a second task on the first output value to generate a second output value. The second processing element may also receive context from the first processing element and use the context when executing the task on the first output value to generate the second output value. The first and second processing elements may correspond to any of the PEs 211-214 shown in the data pipeline.

During execution, the PEs 211-214 may simultaneously execute and perform different sub-tasks that are part of a larger collaborative task. For example, a first processing element may generate a first output based on execution of a first sub-task and a second processing element may generate a second output based on execution of a second sub-task on the first output. Both the first and second outputs may generate results that are used as part of a larger processing task such as a training process for a machine learning model, an extract, transform, and load process for a database, and the like. For example, a first processing element may convert content into vector form and forward the vector to a second processing element which executes a machine learning model on the vector to generate a predicted output. In this example, a parameter used by the vectorization algorithm may be provided to the second processing element and may dictate a parameter that is used by the machine learning model. Furthermore, while executing the sub-tasks, the PEs 211-214 may also simultaneously transfer context amongst themselves. In some embodiments, the PEs 211-214 may be executed on different cores of a multicore processor, but embodiments are not limited thereto.

Figure 3A:
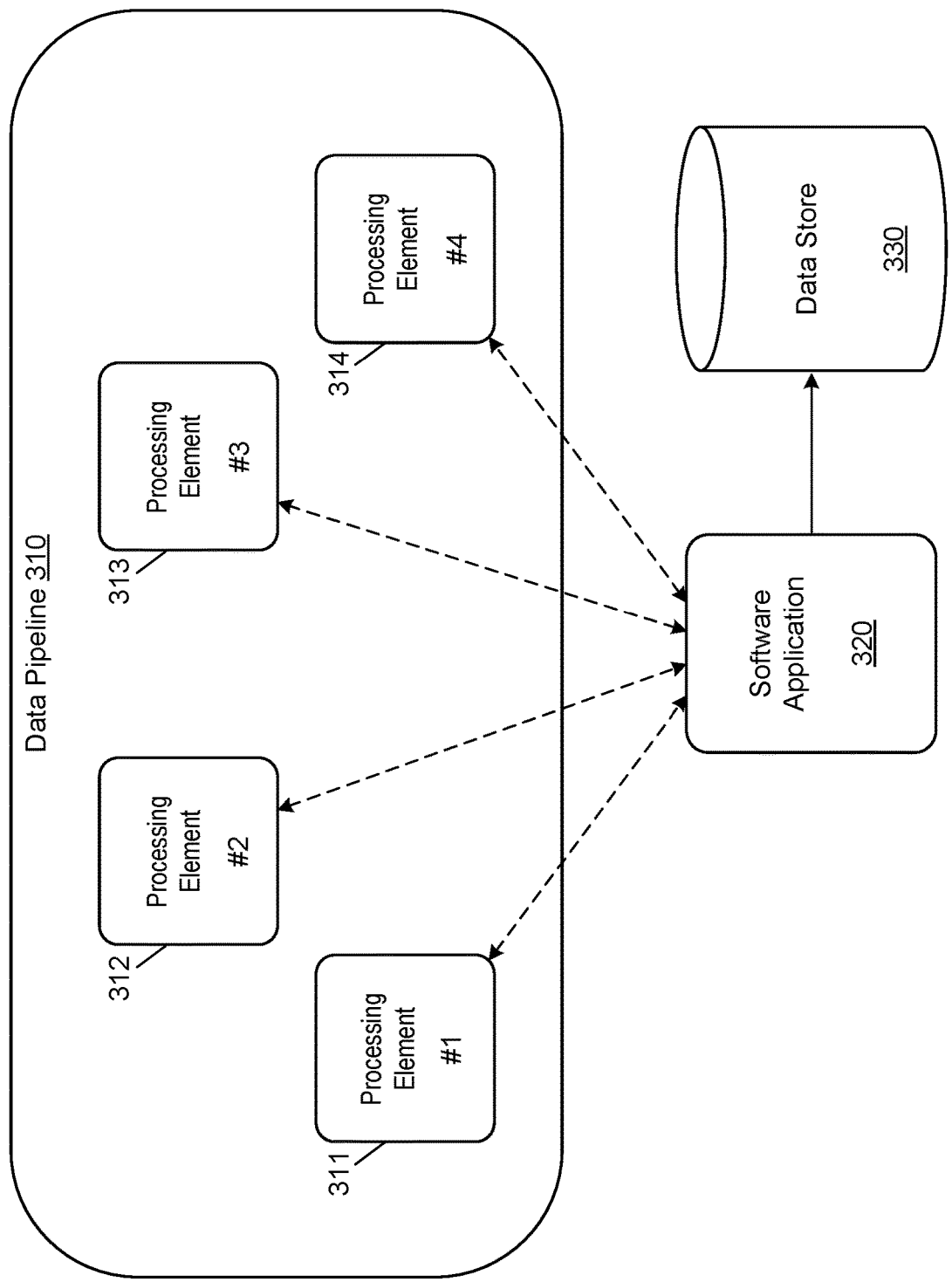

FIGS. 3A-3D illustrate processes for configuring parameters of a data pipeline based on context according to example embodiments. For example, FIG. 3A illustrates a process 300A of identifying parameters and other attributes of a plurality of processing elements within a data pipeline 310. In this example, the process may be performed by a software application 320 that hosts the data pipeline 310.

The software application 320 may be hosted by a host platform that is not shown such as a cloud platform, a web server, a database, a combination of systems, and the like. The software application 320 may store runtime data, historical data, log data, parameter data, conditions, and the like, within a data store 330. The software application 320 may be executed by a processor and may carry out the steps described in the present application.

According to various embodiments, the software application 320 may collect data about the processing elements within the data pipeline 310, for example, by querying the processing elements themselves, querying the data store 330, querying external data sources, and the like. As another example, the data may be submitted by a user via a user interface such as shown in the example of FIG. 3D. The data collected may include data that identifies parameters that are associated with each processing element including parameters such as predicted outputs that are generated at runtime. The collected data may also include identifiers of user-configurable parameters such as model weights, variable values, etc. that can be used to dynamically configure the execution of the processing element, etc.

Referring again to FIG. 3A, the data pipeline includes a processing element 311, a processing element 312, a processing element 313, and a processing element 314. The software application 320 may obtain data about the processing elements and build a graph that it uses to manage the execution of the data pipeline 310. The graph may include a graph of the processing elements (e.g., nodes in the graph, etc.) including how data flows between the processing elements, direction of the flow, and the like. In addition, and as further described herein, context associated with the processing elements may also be embedded within the graph.

Figure 3B:
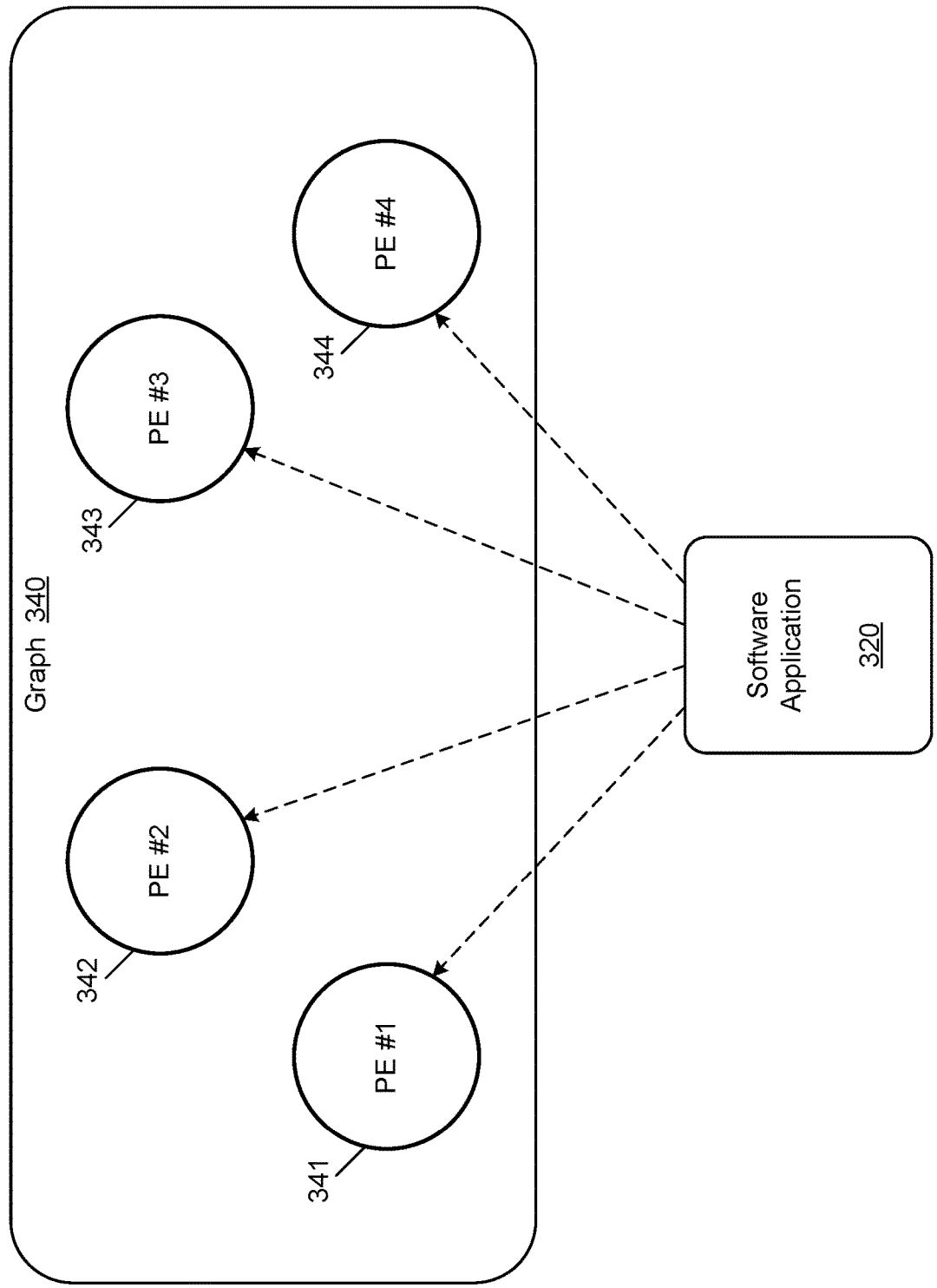
Figure 3D:
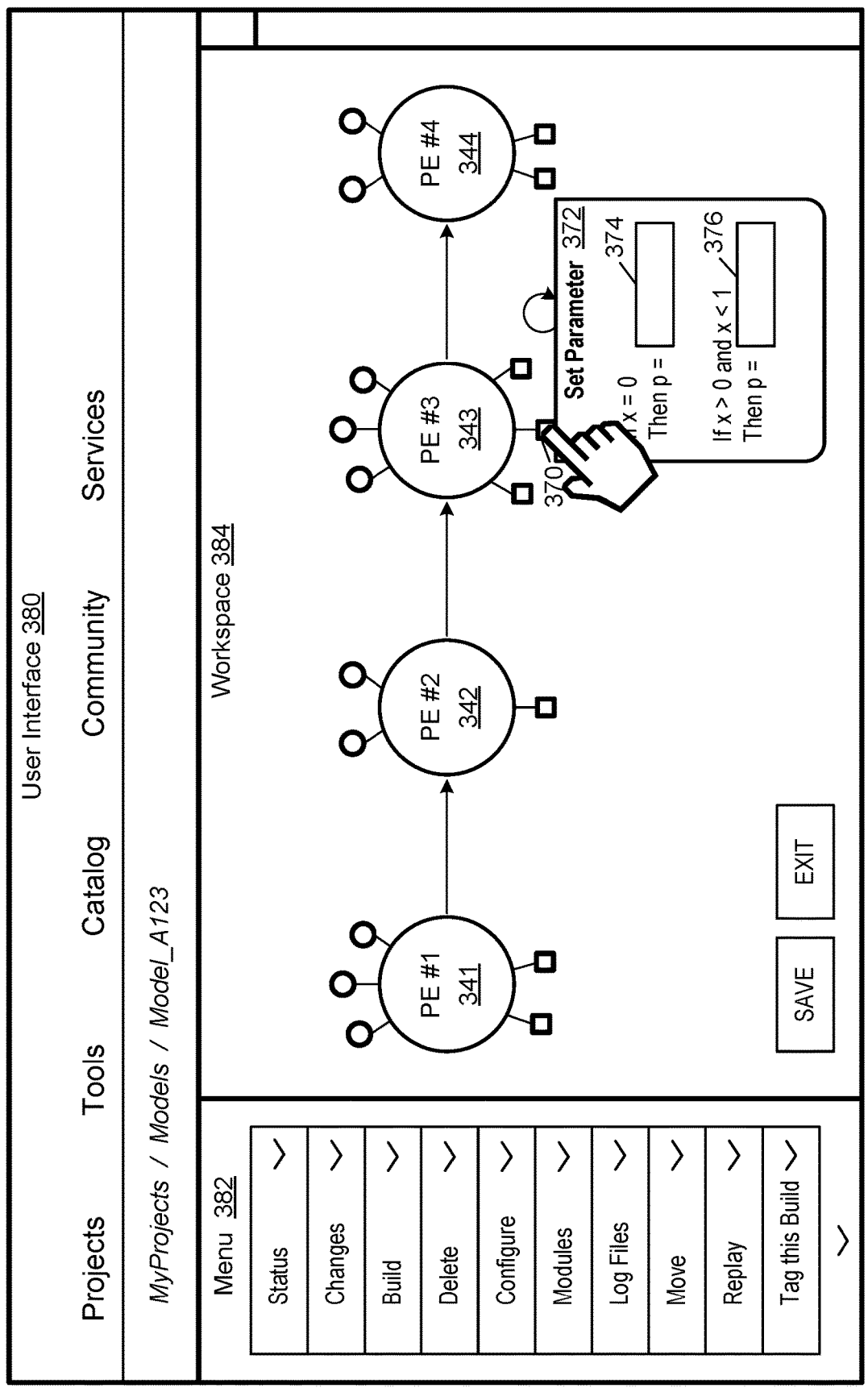

For example, FIG. 3B illustrates a process 300B of generating a graph 340 based on the data collected in FIG. 3A. In this example, the software application generates a plurality of nodes within the graph 340 that represent the plurality of processing elements shown in the example of the data pipeline 310 in FIG. 3A. Here, a node 341 within the graph 340 in FIG. 3B corresponds to the processing element 311 in FIG. 3A. Likewise, a node 342 corresponds to a processing element 312, a node 343 corresponds to a processing element 313, and a node 344 corresponds to a processing element 314. Here, the software application 320 may identify the input/output relationships between the different processing elements based on the data collected, and use the input/output relationships to rearrange the nodes within the graph 340 as shown in the example of FIG. 3C.

For example, FIG. 3C illustrates a process 300C of arranging the nodes within the graph based on the processing relationships amongst the processing elements within the data pipeline 310. In this example, the nodes within the graph 340 in FIG. 3B have been rearranged creating a modified graph 340b in FIG. 3C. In the modified graph 340b, the node 341 includes a plurality of clickable parameters including static parameters 350 and user-configurable parameters 360. In this example, a user may click on the static parameters 350 and view the parameters in a read-only manner. Meanwhile, a user may click on the user-configurable parameters 360 and dynamically configure a parameter of a task that is executed by a processing element. For example, the user may dynamically configure a weight on a variable, a parameter value, a model being used, a calculation performed, and the like.

In some embodiments, the software application 320 may output a user interface which can be viewed by an administrator or other user of the data pipeline 310. Through the user interface, the user may configure the elements within the pipeline, the functions performed by each pipeline, the context that is exchanged between the processing elements, the dynamically driven parameters, and the like.

For example, FIG. 3D illustrates a process 300D of setting a parameter value of a processing element within the data pipeline 310 via a user interface 380. For example, the graph 340b shown in FIG. 3C may be rendered within a workspace 384 of the user interface 380. Here, a user may user a cursor or other selector to hover over a parameter and click on it to drill-down into more information and available commands. For example, in FIG. 3D, a user presses on a parameter 370 underneath the node 343 in the workspace 384 which causes the user interface 380 to display a menu 382 with controls for dynamically configuring parameters of the third processing element within the data pipeline 310.

As an example, a user may click on a user-configurable parameter 370 on the node 343 which causes the menu 382 to be overlayed within the workspace 384. The menu 372 input fields 374 and 376 for inputting conditional values for two different conditions that are dynamically chosen from based on a parameter value fed from the second processing element during execution. Here, a user can select which values or ranges of values to configure the processing element.

Figure 4A:
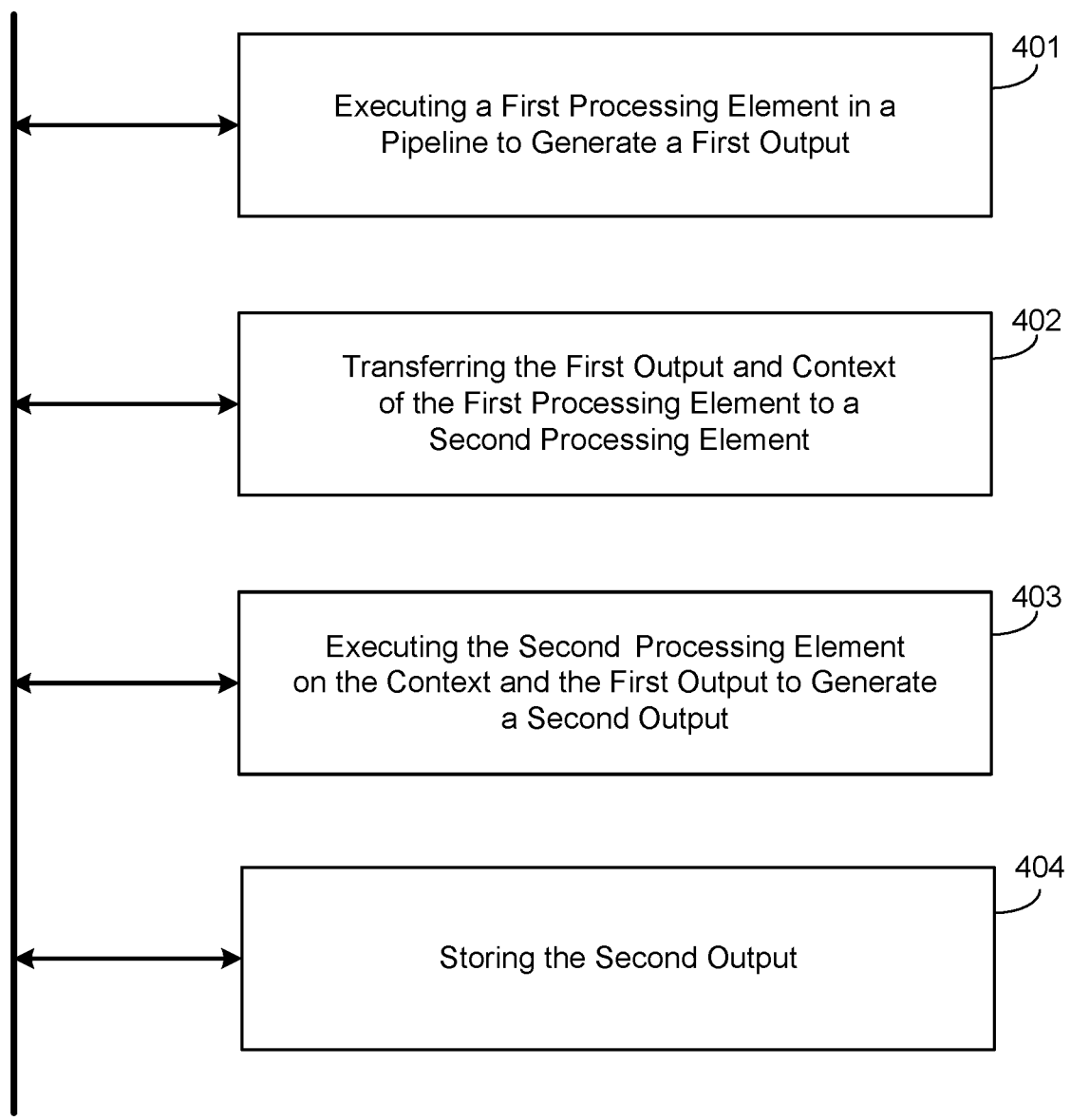
FIG. 4A is a diagram illustrating a method of executing a data processing pipeline based on context transfer between processing elements according to example embodiments.

FIG. 4A illustrates a method 400 of executing a data pipeline based on context transfer between processing elements according to example embodiments, and FIG. 4B illustrates a method 410 of executing a data pipeline based on context transfer between processing elements according to other example embodiments. Referring to FIG. 4A, in 401, the method may include executing a first processing element among a sequence of processing elements within a data processing pipeline on input data to generate a first output. In 402, the method may include transferring the first output and context associated with the first processing element from the first processing element to a second processing element among the sequence of processing elements, within the data processing pipeline. In 403, the method may include executing the second processing element on the first output and the context to generate a second output. In 404, the method may include storing the second output in memory.

Referring now to FIG. 4B, in some embodiments, in 411 the sequence of processing elements may include a sequence of processing nodes configured to perform a different subtask that is part of a larger task, respectively. In 412, the method may further include querying a processing element for a name and one or more user-configurable parameters associated with the processing element and storing the name and the one or more configurable parameters in the memory. In 413, the method may further include building a graph that comprises a sequence of nodes that correspond to the sequence of processing elements, and annotating the graph with the context. In 414, the method may include executing the sequence of processing elements within the data processing pipeline and transferring context between the sequence of processing elements based on the graph.

In some embodiments, in 415, the method may include executing the sequence of processing elements and simultaneously transferring context among the sequence of processing elements. In 416, the method may further include dynamically determining a value for a parameter of a model that is executed by the second processing element based on the context received from the first processing element and executing the second processing element on the first output based on the dynamically determined value for the parameter of the model. In some embodiments, in 417, the method may further include receiving a value of a parameter used by the first processing element to generate the first output, dynamically determining a value for a parameter of a model that is executed by the second processing element based on the parameter used by the first processing element, and executing the second processing element on the first output based on the dynamically determined value for the parameter of the model.

In an alternate embodiment, data pipelines are created that analyze and respond to contextual information in real-time. For example, a financial institution could use such a pipeline to detect unusual trading patterns immediately, triggering instant alerts or automated actions.

In an alternate embodiment, pipelines are developed that are capable of processing data on the edge, reducing latency and conserving bandwidth. These pipelines could leverage lightweight containerization technologies or IoT-specific processors for efficient edge data processing. The data pipeline consists of a series of interconnected processing elements, both at the edge and in centralized servers. These processing elements are designed to efficiently process data from various sources. The pipeline continuously collects contextual information from a variety of sources, including IoT sensors, weather data, traffic reports, and social media sentiment analysis. This context is made available to the processing elements.

Edge processing elements perform initial real-time analysis on locally generated data, taking advantage of lightweight containerization technologies. For instance, IoT sensors in the city's traffic lights detect traffic congestion. If an edge processing element detects unusual traffic patterns due to an accident or congestion, it instantly generates an alert. This alert and local context are transmitted to centralized processing elements. Centralized processing elements receive the alerts and further analyze the situation using city-wide contextual data. They may then trigger automated responses, such as adjusting traffic signal timings to alleviate congestion or notifying emergency services. Edge processing elements handle localized issues, reducing response times and conserving bandwidth. They can also perform tasks like optimizing energy consumption in street lighting based on real-time data.

This combined pipeline seamlessly integrates edge and central processing, enabling efficient data analysis and response while minimizing network congestion and latency. Quantum pipelines are employed in an alternate embodiment for complex tasks like simulating molecular structures, optimizing logistics networks, or solving cryptographic challenges.

In an alternate embodiment, the data processing pipeline is implemented on edge devices equipped with AI accelerators, allowing for real-time data processing at the edge, making it suitable for applications like autonomous vehicles and smart factories. The pipeline adapts its processing elements based on the edge device's available resources and local context, ensuring efficient and low-latency data processing. Quantum computers, available in the advanced technology landscape, are utilized within the data processing pipeline for tasks such as simulating molecular structures, optimizing logistics networks, and solving cryptographic challenges. Quantum processing elements significantly accelerate the processing of computationally intensive tasks. In parallel, the data processing pipeline is deployed on edge devices equipped with AI accelerators. These edge devices are suitable for applications like autonomous vehicles and smart factories, where real-time data processing is crucial. The pipeline intelligently adapts its processing elements based on the resources available on the edge device and the local context. For instance, an autonomous vehicle equipped with AI accelerators can process sensor data in real time, making split-second decisions for navigation.

Depending on the complexity of the task, the pipeline dynamically allocates portions of the workload to quantum processors and edge devices with AI accelerators. For instance, complex cryptographic challenges may be offloaded to quantum processors while real-time sensor data processing remains on the edge device. The current embodiment ensures efficient utilization of available resources and low-latency data processing, critical for applications requiring immediate responses, such as autonomous vehicles making split-second decisions.

In an alternate embodiment, blockchain technology is incorporated within the data pipeline to securely record each processing element's context, parameter changes, and outputs, creating an immutable ledger of data transformations and enhancing transparency and trustworthiness.

Each processing element within the data pipeline records its context, parameter changes, and outputs as transactions on the blockchain. These transactions are cryptographically secured, time-stamped, and linked together in blocks, creating an immutable ledger of data transformations. By utilizing blockchain, the data pipeline provides complete transparency into every step of data processing. Users and stakeholders can trace the flow of data, the parameters used, and the changes made at each processing element, ensuring accountability and auditability. The immutability of the blockchain ledger ensures that once data is recorded, it cannot be altered or deleted. This guarantees the integrity of data transformations and outputs, preventing unauthorized changes or tampering. Blockchain's decentralized nature and consensus mechanisms enhance trust among users and stakeholders. They can rely on the integrity and accuracy of data within the pipeline, making it suitable for critical applications like financial transactions, healthcare data processing, and supply chain management. Smart contracts, executable code on the blockchain, can automate certain actions based on predefined conditions. In the context of the data pipeline, smart contracts can trigger actions when specific parameters or context changes occur, enabling automated responses to events.

In an alternate embodiment, Explainable AI (XAI) is incorporated within the pipeline to provide interpretable insights into how and why parameter changes occur based on context, enhancing transparency and trust in AI-driven decision-making, and making it easier for users to understand and control the pipeline's behavior. XAI algorithms are applied to the data pipeline, allowing it to generate interpretable insights into how and why parameter changes occur based on context. This means that users can clearly understand the pipeline's decision-making process and the factors influencing those decisions. XAI techniques provide contextual explanations. Users can see why specific parameters were adjusted, which data elements influenced those adjustments, and how they relate to the desired outcomes. This contextual interpretation empowers users to make informed decisions and identify potential biases or anomalies in the pipeline's behavior. With XAI, users have more control over the data pipeline's behavior. They can not only understand the AI-driven decisions but also intervene when necessary. Users can set constraints, define rules, or manually adjust parameters based on the insights provided by XAI, ensuring that the pipeline aligns with their goals and ethical considerations. The incorporation of XAI greatly enhances the transparency and trustworthiness of the data pipeline. Users and stakeholders can trust the decisions made by AI models, knowing that they are backed by clear, interpretable reasoning. This is particularly crucial in industries with stringent regulatory requirements, such as healthcare and finance. XAI provides real-time insights, making it possible for users to monitor the pipeline's behavior continuously. If unexpected parameter changes or unusual context-based decisions occur, users can quickly identify and address them, maintaining control and ensuring the pipeline's reliability.

Advanced AI models for natural language understanding and computer vision are employed in an alternate embodiment to infer context from unstructured data sources. An AI-driven context inference module is included that extracts rich context from sources like text, images, and videos. This context informs parameter adjustments and data processing decisions within the pipeline, making it more adaptable to diverse data types. The data pipeline harnesses the power of cutting-edge AI models to perform context inference from unstructured data sources. This step significantly enriches the context available for parameter adjustments and data processing decisions within the pipeline. The inclusion of AI models specialized in natural language understanding allows the pipeline to extract context from textual data sources. This can include documents, articles, social media posts, or any text-based content. The AI models analyze the text, identify relevant entities, sentiments, and topics, and generate structured context data. AI models with computer vision capabilities are also employed to process images and videos. These models can recognize objects, scenes, people, and even emotions from visual content. The extracted visual context is integrated into the pipeline's decision-making process.

The AI-driven context inference module informs parameter adjustments within the pipeline. For example, if the pipeline is processing news articles, and the context inference module detects a shift in public sentiment regarding a particular topic, it can dynamically adjust sentiment analysis parameters to align with the current sentiment trends. One of this embodiment's key advantages is the pipeline's adaptability to diverse data types. Whether it's text, images, videos, or a combination of these, the AI-driven context inference module ensures that the pipeline can understand and respond to each data type's specific characteristics and nuances. The context inference module operates in real-time, continuously analyzing incoming unstructured data. This means that the pipeline can adapt rapidly to changing contexts, making it ideal for applications that involve dynamic and evolving information sources, such as news aggregation or social media monitoring.

In one embodiment, the apparatus of the instant solution includes a memory and a processor, both communicatively coupled, to facilitate the operation of the data processing pipeline. The memory stores data, while the processor manages the execution of the processing elements within the pipeline. The data processing pipeline consists of a sequence of processing elements (PEs), which can be thought of as computational units. The sequence begins with the first processing element (PE1), followed by the second processing element (PE2), and so on. Each processing element takes input data, processes it, and generates an output. Importantly, these processing elements are interconnected, enabling the transfer of data and context between them. For example, when PE1 processes input data, it generates an output and context related to its processing. This context might include parameters, variables, or other relevant information. PE1 then sends a message containing the output and context to PE2. The message includes data generated by PE1 and the context required for PE2 to understand and process this data effectively. The originating processor for the message from PE1 is the processor managing PE1's execution, and the destination processor is the processor managing PE2's execution. This communication facilitates the flow of data and context between processing elements, allowing PE2 to execute based on the output and context received from PE1. PE2, in turn, generates its output, which may also include new context, and stores it in memory.

In one embodiment, the processor executing the instant solution is responsible for managing the execution of the processing nodes within the data processing pipeline. The data processing pipeline is comprised of a sequence of processing nodes. These nodes represent individual computational units that collectively work on a larger processing task. The sequence begins with the first processing node (Node 1), followed by the second processing node (Node 2), and so on. Each processing node generates an output as part of the larger processing task.

For example, the processing nodes collectively perform a complex data transformation task. Node 1 processes initial input data and sends a message containing its output to Node 2. This message originates from the processor managing Node 1's execution and is directed towards the processor managing Node 2's execution. The message exchanged between Node 1 and Node 2 is essential to communication within the data processing pipeline. It includes data generated by Node 1 and context relevant to Node 2's processing. Node 2 then takes this data, processes it further, and generates its output. This process continues iteratively until the final output for the larger processing task is achieved. Messages are continually sent and received throughout this sequence of processing nodes, each carrying the data and context required for the next processing node to execute effectively. This collaborative communication and processing approach enables the generation of a sequence of outputs, including the first output and the second output, as part of the larger processing task.

In one embodiment, the apparatus of the instant solution plays a central role in identifying and querying the processing elements within the data processing pipeline. For example, a user or an automated system seeks to configure specific parameters associated with one of the processing elements within the sequence. Node 2 within the data processing pipeline, which corresponds to a second processing element is tasked with executing a particular data transformation operation as part of the larger processing task. To configure Node 2's parameters, the processor initiates a query directed at Node 2. This query message, originating from the processor managing the pipeline's configuration, is sent to Node 2. The message requests information regarding Node 2's name and any user-configurable parameters it supports. Node 2, upon receiving the query message, responds with a message that includes its name and a list of user-configurable parameters. This response message is sent back to the originating processor. It essentially serves as a data packet containing essential information about Node 2's identity and the specific parameters that can be configured to tailor its behavior. Having received Node 2's response message, the originating processor can now present this information to the user or incorporate it into an automated configuration process. Users can then make informed decisions about how to adjust Node 2's parameters to meet their specific requirements.

This interaction allows for the customization of processing elements within the data processing pipeline, enhancing the flexibility and adaptability of the system.

In one embodiment, a graph is constructed comprising a sequence of nodes corresponding to the sequence of processing elements within the data processing pipeline, along with the annotation of this graph with context. The processor plays a crucial role in constructing and annotating the graph representing the data processing pipeline. Consider a data processing pipeline designed for natural language understanding tasks, including various processing elements such as tokenization, named entity recognition, and sentiment analysis. The processor, responsible for managing the pipeline's execution, aims to create a visual representation of the pipeline for better oversight and management. The processor initiates a message to each processing element in the sequence, requesting information necessary to construct the graph. These messages, originating from the processor, are directed at each processing element within the pipeline sequentially. Upon receiving the request, each processing element responds with a message providing its identity, position within the pipeline, input and output connections, and relevant context information. These response messages are sent back to the originating processor. As the processor gathers responses from all processing elements, it constructs a graph. Each processing element corresponds to a node in the graph, and the connections between processing elements are represented as edges. The processor annotates the graph with context information obtained from the responses. For example, it might include information on the expected data types, the dependencies between elements, and any dynamically configurable parameters. Once the graph is constructed and annotated, it provides a comprehensive visual representation of the data processing pipeline, showcasing the flow of data and context between processing elements. This visual representation aids in monitoring, debugging, and optimizing the pipeline's performance.

In one embodiment, a sequence of processing elements is executed within the data processing pipeline while simultaneously transferring context between these elements based on the constructed graph. The processor, equipped with the constructed graph representing the data processing pipeline and its context annotations, coordinates the execution and context transfer. The processor initiates the execution process by sending a start message to the first processing element in the sequence. This message is directed from the processor (originating processor) to the initial processing element (destination processor). Upon receiving the start message, the first processing element begins executing its task on the provided input data. Simultaneously, it extracts the associated context and sends it as a context message to the next processing element in the sequence. This context message is generated and transmitted by the first processing element (originating processor) and received by the second processing element (destination processor). Upon receiving the context message, the second processing element interprets the context data to dynamically configure its parameters or operations. It then proceeds with its task on the output generated by the first processing element. After executing its task, the second processing element generates an output and attaches a new context relevant to its operation. This output and context are transmitted as an output message to the subsequent processing element. The output message is generated and sent by the second (originating processor) and received by the third (destination) processing element.

This process continues iteratively through the sequence of processing elements, with each element executing its task, transferring context, and passing data and context to the next element. The graph annotations aid each processing element in understanding the required configurations and dependencies during execution. When the final processing element in the sequence completes its task, the entire pipeline is executed as a cohesive unit, with data and context seamlessly flowing from one processing element to the next. The current embodiment exemplifies how the processor orchestrates the execution of processing elements, and messages are exchanged between each element to ensure the proper transfer of data and context throughout the pipeline, ultimately achieving the intended processing task.

In one embodiment, processing elements in a data processing pipeline are simultaneously executed, while also transferring context among these elements. The processor, equipped with the constructed graph and context annotations, is responsible for coordinating the execution and context transfer. The processor initiates the execution process by sending a start message to the first processing element in the sequence. This start message is generated by the processor (originating processor) and received by the initial processing element (destination processor). The first processing element begins its execution on the input data, and during this process, it extracts context relevant to its operation. Now, in a simultaneous manner, the first processing element sends a context message to the second processing element. This context message is generated by the first processing element (originating processor) and received by the second processing element (destination processor). Upon receiving the context message, the second processing element dynamically configures its parameters or operations based on the provided context. It then proceeds with its task on the output generated by the first processing element. After executing its task, the second processing element generates an output and attaches a new context relevant to its operation. Simultaneously, the second processing element sends an output message to the third processing element. This output message is generated by the second (originating processor) and received by the third (destination) processing element. This simultaneous execution, context extraction, and message passing continue iteratively through the sequence of processing elements. Each processing element uses the context received from the previous element to configure its operations, thus enabling dynamic adjustments during execution. By the time the final processing element in the sequence completes its task, the entire pipeline has been executed as a coordinated unit, with data and context seamlessly flowing between processing elements.

In one embodiment, a value for a model parameter executed by the second processing element is determined based on the context received from the first processing element and then executing the second process element accordingly. The processor, equipped with the constructed graph and context annotations, is responsible for coordinating the execution and parameter configuration. As in the previous embodiments, the originating processor sends a start message to the first processing element. The first processing element initiates its task on the input data and, during its execution, extracts context relevant to its operation. Upon completing its operation, the first processing element sends an output message to the second processing element, containing both the output data and the context extracted. This message is generated by the first processing element (originating processor) and received by the second processing element (destination processor). The second processing element, upon receiving the output message from the first processing element, dynamically determines a value for a parameter of the model it executes based on the context provided in the message. This dynamic parameter configuration allows the second processing element to adapt its operation to the specific context received from the previous processing element. Having configured the parameter, the second processing element then proceeds to execute its task on the received output data, incorporating the dynamically determined parameter value. After executing its task, the second processing element generates an output and attaches a new context relevant to its operation. It simultaneously sends an output message containing this new output data and context to the third processing element. Once again, this output message is generated by the second (originating processor) and received by the third (destination) processing element.

This process iterates through the sequence of processing elements, with each element dynamically configuring its parameters based on the received context and executing its task accordingly.

In one embodiment, the second processing element determines a value for a parameter of a model based on the parameter used by the first processing element, enabling adaptive processing within the data pipeline. In the current embodiment, the apparatus with its memory, processor, and data processing pipeline is utilized as before. With its graph and context annotations, the processor plays a central role in coordinating the execution and parameter adaptation across the processing elements. The originating processor sends a start message to the first processing element. This message initiates the first processing element's operation on the input data. During this execution, the first processing element extracts context and determines a value for a parameter, which is an integral part of its task. Upon completing its operation, the first processing element generates an output message containing both the output data and the determined parameter value. This message is generated by the first processing element (originating processor) and received by the second processing element (destination processor). The second processing element, upon receiving the output message from the first processing element, utilizes the received parameter value as part of its dynamic parameter configuration. This means that the second processing element adapts its operation based on the parameter used by the first processing element, effectively extending the adaptive capability of the data pipeline. With the parameter now configured, the second processing element proceeds to execute its task on the received output data. After execution, it generates an output message containing its output data and additional context relevant to its operation. Simultaneously, this output message is sent to the third processing element, ensuring that the adaptive parameter is propagated through the pipeline. This process continues through the sequence of processing elements, where each element adapts its parameters based on the parameter value received from the previous element.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:
a processor implemented in hardware that, when executing one or more instructions stored in a memory, is configured to:
execute a data processing pipeline comprising a sequence of processing elements, wherein
a first processing element of the sequence of processing elements is configured to:
receive input data;
execute a first task on the input data using a plurality of parameters associated with the first processing element;
generate a first output based on the execution of the first task;
generate a message comprising the first output and a context associated with the first task, wherein the context corresponds to the plurality of parameters used by the first processing element in the execution of the first task; and
transmit the message to a second processing element of the sequence of processing elements, and
the second processing element is configured to:
receive the transmitted message;
dynamically configure, based on the context within the received message, a model associated with the second processing element;
execute a second task, based on the dynamically configured model and the first output within the received message; and
generate a second output based on the execution of the second task;
generate a graph comprising a sequence of nodes corresponding to the sequence of processing elements; and
store the second output in the memory.

2. The apparatus of claim 1, wherein the sequence of processing elements is configured to:
generate a sequence of outputs, including the first output and the second output, as part of a larger processing task.

3. The apparatus of claim 1, wherein the processor is further configured to:
identify a name and one or more user-configurable parameters associated with at least one processing element of the sequence of processing elements based on a query of the at least one processing element by the processor.

4. The apparatus of claim 1, wherein the processor is further configured to:
annotate the graph with the context.

5. The apparatus of claim 4, wherein the sequence of processing elements is configured to:
transfer the context between the sequence of processing elements based on the annotated graph.

6. The apparatus of claim 1, wherein the sequence of processing elements is configured to:
simultaneously transfer the context among the sequence of processing elements.

7. The apparatus of claim 1, wherein when the second processing element dynamically configures the model and executes the second task, the second processing element is further configured to:
dynamically determine a value for a parameter of the model based on the context; and
generate the second output based on the dynamically determined value.

8. The apparatus of claim 1, wherein
the context comprises a value of a parameter of the plurality of parameters used by the first processing element, and
when the second processing element dynamically configures the model and executes the second task, the second processing element is further configured to:
dynamically determine a value for a parameter of the model based on the value of the parameter used by the first processing element; and
generate the second output based on the dynamically determined value for the parameter of the model.

9. A method, comprising:
by a processor implemented in hardware, executing a data processing pipeline comprising a sequence of processing elements;
by a first processing element of the sequence of processing elements, receiving input data;
by the first processing element, executing a first task on the input data using a plurality of parameters associated with the first processing element;
by the first processing element, generating a first output based on the executing of the first task;
by the first processing element, generating a message comprising the first output and a context associated with the first task, wherein the context corresponds to the plurality of parameters used by the first processing element in the executing of the first task;
by the first processing element, transmitting the message to a second processing element of the sequence of processing elements;
by the second processing element, receiving the transmitted message;
by the second processing element, dynamically configuring a model associated with the second processing element based on the context within the received message;

by the second processing element, executing a second task based on the dynamically configured model and the first output within the received message;

by the second processing element, generating a second output based on the executing of the second task;

by the processor, generating a graph comprising a sequence of nodes corresponding to the sequence of processing elements; and by the processor, storing the second output in a memory.

10. The method of claim 9, further comprising:
generating, by the sequence of processing elements, a sequence of outputs, including the first output and the second output, as part of a larger processing task.

11. The method of claim 9, further comprising:
querying at least one processing element of the sequence of processing elements for a name and one or more user-configurable parameters associated with the at least one processing element; and
storing the name and the one or more user-configurable parameters in the memory.

12. The method of claim 9, further comprising:
annotating, by the processor, the graph with the context.

13. The method of claim 12, further comprising:
transferring, by the processor, the context between the sequence of processing elements based on the annotated graph.

14. The method of claim 9, further comprising:
simultaneously transferring, by the processor, the context among the sequence of processing elements.

15. The method of claim 9, wherein the dynamically configuring the model and the executing of the second task further comprise:
dynamically determining a value for a parameter of the model based on the context; and
generating the second output based on the dynamically determined value.

16. The method of claim 9, wherein
the context comprises a value of a parameter of the plurality of parameters used by the first processing element, and
the dynamically configuring the model and the executing the second task, further comprise:
dynamically determining a value for a parameter of the model based on the value of the parameter used by the first processing element; and
generating the second output based on the dynamically determined value for the parameter of the model.

17. A computer-readable storage medium comprising instructions that, when executed by a processor executing a data processing pipeline comprising a sequence of processing elements, cause the processor to perform:

by a first processing element of the sequence of processing elements, receiving input data;

by the first processing element, executing a first task on the input data using a plurality of parameters associated with the first processing element;

by the first processing element, generating a first output based on the executing of the first task;

by the first processing element, generating a message comprising the first output and a context associated with the first task, wherein the context corresponds to the plurality of parameters used by the first processing element in the executing of the first task;

by the first processing element, transmitting the message to a second processing element of the sequence of processing elements;

by the second processing element, receiving the transmitted message;

by the second processing element, dynamically configuring a model associated with the second processing element based on the context within the received message;

by the second processing element, executing a second task based on the dynamically configured model and the first output within the received message;

by the second processing element, generating a second output based on the executing of the second task;

by the processor, generating a graph comprising a sequence of nodes corresponding to the sequence of processing elements; and by the processor, storing the second output in a memory.

18. The computer-readable storage medium of claim 17, wherein the instructions further cause the processor to perform:
querying at least one processing element of the sequence of processing elements for a name and one or more user-configurable parameters associated with the at least one processing element; and
storing the name and the one or more user-configurable parameters in the memory.

19. The computer-readable storage medium of claim 17, wherein the instructions further cause the processor to perform:
annotating the graph with the context.

20. The computer-readable storage medium of claim 19, wherein the instructions further cause the processor to perform:
transferring the context between the sequence of processing elements based on the annotated graph.

* * * * *